May 3, 1932. M. SMOLENSKY 1,856,974
SELF GRINDING STOP VALVE
Filed Aug. 30, 1930 3 Sheets-Sheet 1

Inventor
Michael Smolensky,
By Justin W. Macklin,
his Attorney

May 3, 1932.   M. SMOLENSKY   1,856,974
SELF GRINDING STOP VALVE
Filed Aug. 30, 1930   3 Sheets-Sheet 2
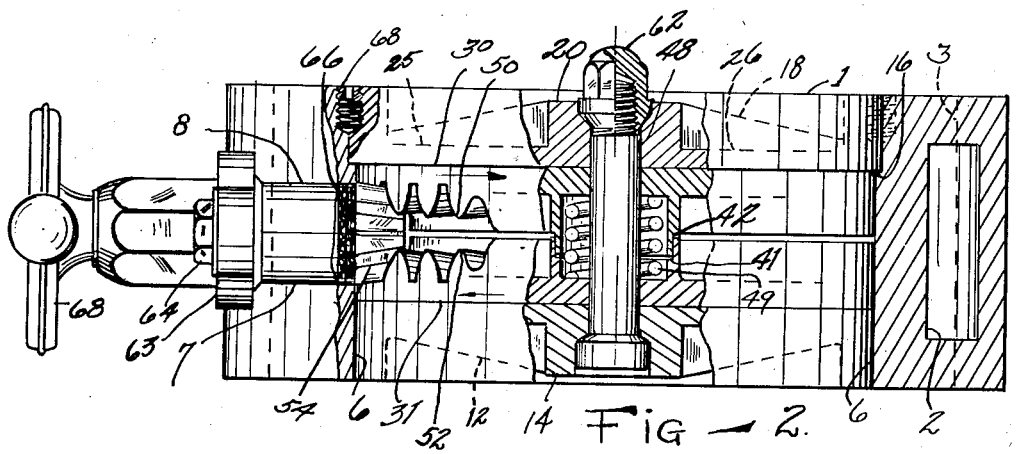
Fig. — 2.
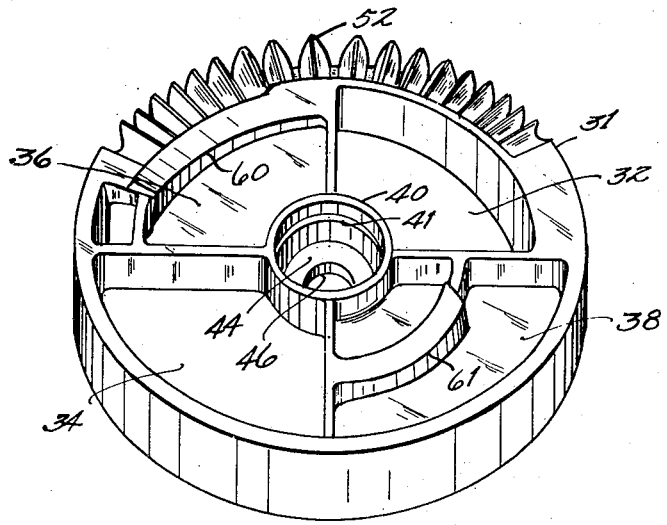
Fig. — 4.
Inventor
Michael Smolensky
By Justin W. Macklin,
his Attorney

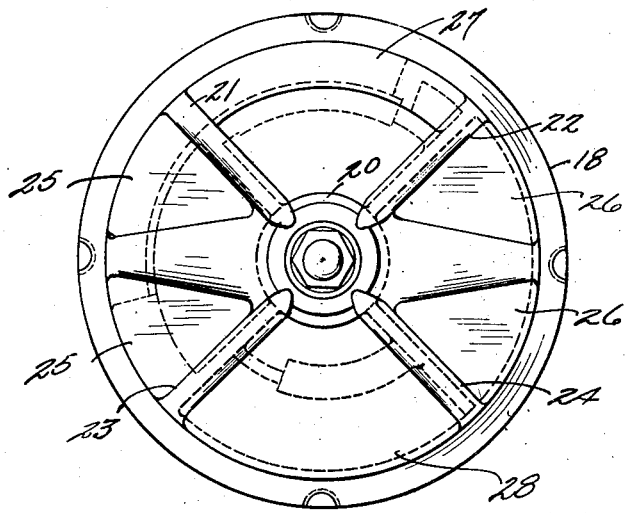
FIG.—5.
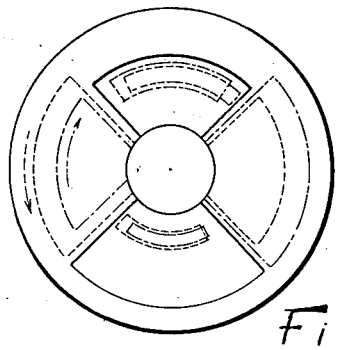
FIG.—6.
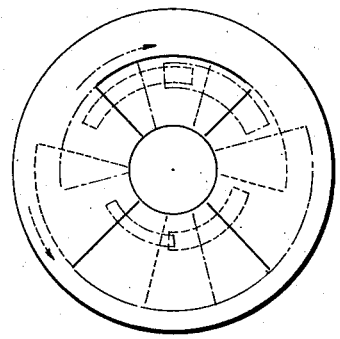
FIG.—7.
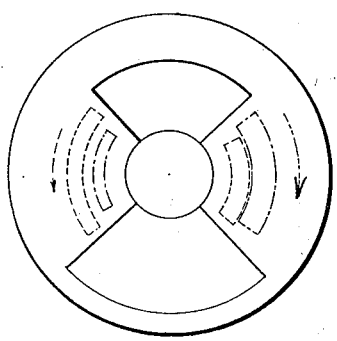
FIG.—8.

Patented May 3, 1932

1,856,974

UNITED STATES PATENT OFFICE

MICHAEL SMOLENSKY, OF GARFIELD HEIGHTS, OHIO

SELF-GRINDING STOP VALVE

Application filed August 30, 1930. Serial No. 478,896.

This invention relates to stop valves and is particularly concerned with a self-grinding stop valve.

Heretofore in this type of valve some difficulty has been encountered, due to wearing and warping of the valve seat or roughening of the closure areas. Furthermore, there is a tendency for chemicals in the water to deposit on the sealing surfaces. As a result the valve does not operate to seal the line effectively.

One of the objects of my invention is a valve of this type, the usual operation of which cleans the contact areas and grinds them to more nearly perfect surfaces, whereby the valve is effective for a long period of time without repairs, replacements or cleaning.

Another object of my invention is a valve in which warping of the operation surfaces is eliminated.

Another object of my invention is a valve of this character in which a flat surface is presented to the openings through the valve for closing the same and the necessity for a valve seat of the usual type is eliminated.

Another object of my invention is a lock valve in which a comparatively direct flow of liquid or fluid through the valve may be obtained.

Another object of my invention is a self-grinding and cleaning valve which delivers the removed material into the fluid stream whereby it is carried away so as not to score or wear the working parts.

Still another object of my invention is a valve which is simple in construction and economical to manufacture, the manufacturing requiring only machining of the closing mechanism for effective operation when sealed, thus dispensing with the expensive grinding operations.

In the drawings—

Fig. 2 is a side elevation of the valve illustrated in Fig. 1, part thereof being shown in section for purposes of clearness.

Fig. 4 is a perspective view of one of the closure disks.

Fig. 5 is a partial top plan view of the valve illustrated in Fig. 2.

Figs. 6, 7 and 8 are somewhat diagrammatic illustrations of the operation of the valve.

Figure 1:
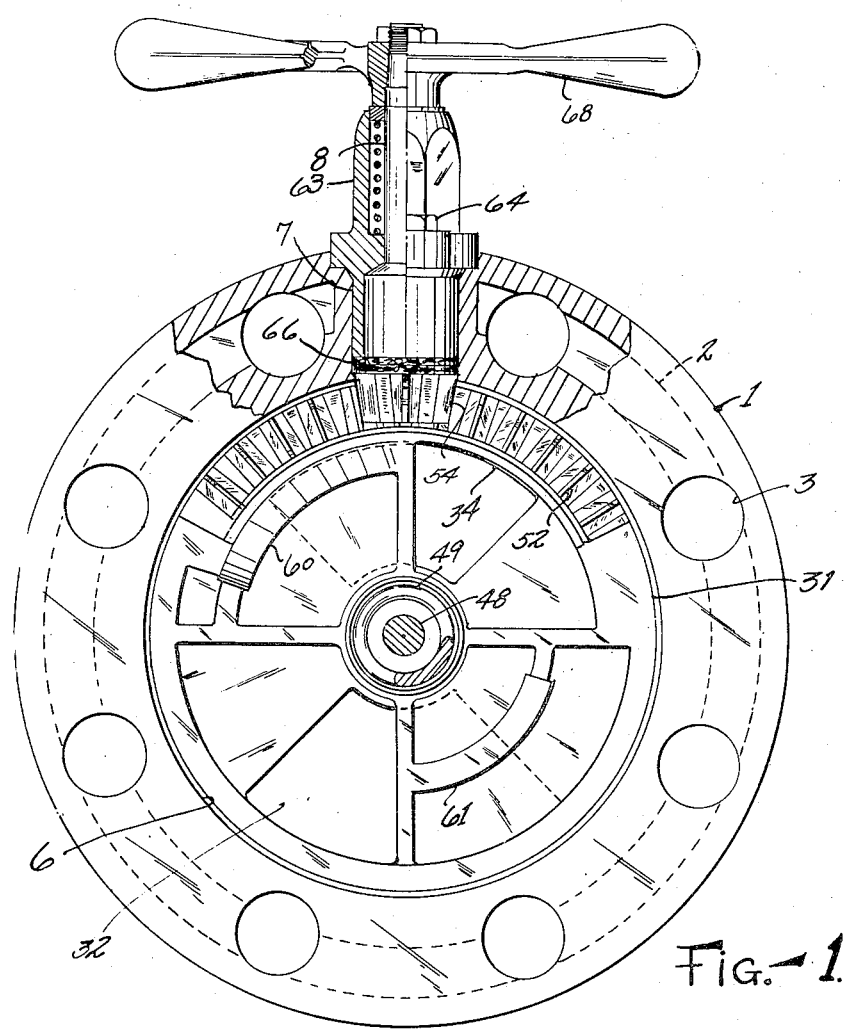
Fig. 1 is a cross sectional view through a valve embodying the form of my invention.
Figure 3:
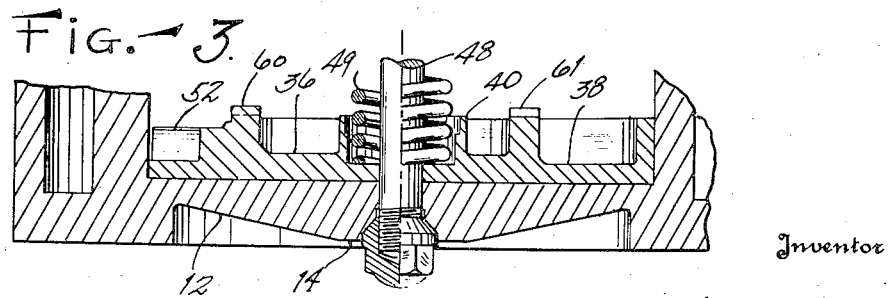
Fig. 3 is a cross sectional view of such a valve illustrating the method of mounting the closure disks.

In the form of my invention illustrated, the valve may include a body 1, which may be a casting formed with an internal annular recess, indicated at 2, to eliminate excess material. The housing is provided with a number of openings 3 adapted to receive bolts for fastening the valve between companion flanges of a pipe line. Instead, however, the housing may be provided with the usual screw thread connections without departing from my invention. The housing has a central bore 6 and a radial communicating bore 7 adapted to receive an operating stem 8, which extends from the outside of the housing to the inside, as better illustrated in Fig. 1, and is rotatable in the bore 7.

For economy in manufacturing, one end of the bore 6 may be left partially closed to form a spider 12 integral with the housing and having a central hub 14. At the opposite end of the bore 6 is an annular shoulder 16 adapted to support a removable spider 18 similar in form to the spider 12. These spiders are preferably mounted in the housing with openings aligned so as to provide direct passage through the valve. As illustrated in Fig. 5, this spider may include a central hub 20 from which radiate a plurality of spokes 21, 22, 23 and 24, which divide the area of the spider into four sections. Opposite sections 25 and 26 of this spider are closed and present smooth bearing surfaces inwardly for operating engagement with the valve disks or plugs as will later be described.

For example, the area between the spokes 21 and 23 is closed, as also is the area between the spokes 22 and 24, while that between spokes 22 and 21 and also between 23 and 24 are open to provide passages 27 and 28 through the valve.

In order to open and close these passages for opening and sealing the valve, I provide closure disks such as 30 and 31, coaxial with and rotatable in the bore 6 of the housing. Since both of these disks may be identical in form, a description of one only need be given. As illustrated in Fig. 4, the disk preferably is cylindrical in form and of a diameter such that it will extend over the spider openings of the housing. The underside of the disk is preferably flat, and is complementary to the upper surface of the spider 12. The disk is provided with openings such as indicated at 32 and 34, adapted to be placed in alignment with the openings 28 and 27 respectively in the spiders, the remainder of the disk forming surfaces 36 and 38. The portion of the disk forming these surfaces may be less in thickness than the thickness of the center or circumferential portions so as to dispense part of the weight of the disk and save material, these surfaces being reinforced by webs where necessary.

The disk has a central hub portion 40 having bores of different diameters, one forming an internal annular shoulder 41 adapted to engage an external annular shoulder 42 on the complementary disk 30. The remaining bores form an annular shoulder 44 in the base of the hub and smaller central opening 46. The disks 30 and 31 are mounted in the housing with their flat surfaces engaging the complementary surfaces of the respective spiders, as mentioned, and are secured in place in the housing by means of a suitable pin or bolt 48. Between the two disks and engaging the shoulder 44 of the disk 31 and the complementary shoulder of the disk 30 is a spring 49, which is compressed when the disks are mounted in operating position. This tends to hold the disks tightly against the spiders so that as the disks are rotated on the pin 48, the surfaces of both the disks and the spiders are kept clean and are ground smoothly.

In order to seal the line, the surfaces of the disks must lie over the openings of the spiders and in this position the disk must be thrust tightly against their respective spiders. In order to rotate the disks in this position or to align the openings in each disk with the aligned openings in the spider so as to open the valve, each disk is provided with a plurality of radial teeth such as indicated at 50 and 52. These teeth engage complementary teeth on gear 54 carried on the operating stem 8 extending outside of the valve body. Obviously as the stem 8 is rotated about its axis the gear 31 and gear 30 are driven in opposite directions. Since the disks move in opposite directions, the openings are increased and decreased rapidly, permitting, however, a slight flow of water to prevent too quick seal and consequent hammer.

In order to seat the disks firmly against the spiders so that when the openings are closed the pressure of the water cannot unseat the disks or move them axially, each disk is provided with a plurality of wedge members such as 60 and 61. As illustrated in Fig. 4, these wedge members slope from the upper or inner surface of the disk upwardly, the low end leading in the direction of movement when the disk is revolved in closing direction. Complementary wedge members are carried on the disk 30. The wedges 60 and 61 are each so positioned that the low portions thereof engage the low portions of complementary wedges on the disk 30, as the surfaces 36 and 38 come into position over their respective openings in the spiders. As the disks are revolved in opposite directions to bring these surfaces entirely over the openings and slightly beyond so as to close the spider openings, the wedges engage each other and tend to force the disks relatively apart so that they are thrust tightly against the flat inner surface of the spiders 12 and 18.

The relative movement of the disks in contact with each other removes any foreign matter from the surfaces and grinds them and carries any loosened matter into the fluid stream.

Since this wedging action develops a heavy axial force or pressure against the web members, it is desirable to reinforce these by securing the pin 48 into or through the hub of both spiders. For this purpose a bevel seat may be provided in each hub, one to receive the head of the bolt 48 and the other to receive a nut 62, both the head and nut having seating areas complementary to those in the hubs. Upon tightening the nut, the spiders are reinforced and the bolt openings effectively sealed.

The valve stem 8 may be mounted in any suitable manner, for instance, as shown in Fig. 1, the stem passing through a sleeved hood 63 secured to the housing by the usual bolts, such as 64, packing being provided at the entrance of the stem into the bore 6, as indicated at 66.

It is desirable that the operating handle 68 be of the spoked rim type and positioned relative to the operating gear so that it will point along the axis of the valve when the valve is open and transverse thereto when the valve is closed.

Referring to the diagrammatic illustrations shown in Figs. 6, 7 and 8, Fig. 6 illustrates the valve with both disks in closed position, the uppermost disk when the valve is positioned as illustrated in Fig. 2 being indicated by the dotted line and the lower disk being indicated by the dot and dash line. Arrows of corresponding lining indicate the direction of movement of the particular disks of the same lines. In Fig. 6, both disks are in the closed position, the wedges being tightly togethed and positioned in alignment with the openings in these spiders. In Fig. 7 the upper disks have been rotated about 30°, the upper disk to the left and the lower disk concurrently to the right, so that the opening of each spider is partially covered by the closure area of its complementary disk. At the same time the wedges have moved slightly off from each other and have relieved the outward axial pressure.

In Fig. 8 the disks have been brought to the full open position. The complementary wedges are in radial alignment but on opposite sides of the center, a small diameter wedge and a large diameter wedge being radially aligned on the same sides of the center. Thus a large and a small diameter wedge are adjacent each other so that the two do not interfere and spread the disks apart in the open position.

It should be noted that the spider 18 is provided about the periphery with openings having their axes parallel to the axis of the inner bore 6 of the housing. Complementary openings are provided in the housing, so positioned that when the openings in the spider are aligned therewith, the spider may be in the proper position. It may then be pinned in this position or held therein by screws such as indicated at 68.

Furthermore, it should be noted that various changes may be made in the form of valve illustrated in the drawings without departing from my invention. For instance, the valve disks may seal against each other, with the wedges outwardly, the complementary wedges being placed in the housing or on the spiders. Also, the number of wedges and openings in the disks may be varied as desired.

I claim:

1. A stop valve comprising a body having an axial bore and a radial bore, spiders in said axial bore having aligned open and closed areas, valve disks within said bore intermediate said spiders, opposed cams on said disks, said disks having open and closed areas alignable with the open and closed areas of said spiders consequent upon a rotation of said disks, said cam means being positioned on said disks to bring the high portions thereof into engagement when the closed areas on said disks are aligned with the openings in said spiders whereby said disks are moved axially apart and into stressed engagement with said spiders, a pin co-axial with said central bore rigidly secured to said spiders, whereby said spiders are reinforced axially, and are retained in their normal positions when the disks are in stressed engagement therewith.

2. A stop valve comprising a body having an axial bore and a communicating radial bore, spiders in said bore having aligned openings and closed areas, valve disks within said bore intermediate said spiders and having open and closed areas complementary to each other and to the openings and closed areas of said spiders, means operable in said radial bore to revolve said disks in opposite directions, whereby the openings in said disks may be aligned with or offset from the openings in said spiders, cam means carried by said disks forcing said disks relatively apart as they are rotated to offset the open areas therein from the open areas of the spiders, whereby said disks are placed in stressed engagement with said spiders when in such position, a pin co-axial with said disks engaging both of said spiders and reinforcing the same against outward axial distortion, and means to adjust the effective length of the pin.

3. A stop valve comprising a body having an axial bore and a radial bore, spiders in said bore having aligned closed areas, the inner faces of said spiders presenting smooth surfaces, disks within said bore intermediate said spiders having openings and closed areas selectively alignable with the closed areas of said spiders consequent upon relative rotation of said disks and spiders, the faces of said disks adjacent to said spiders presenting smooth surfaces thereto, resilient means intermediate said disks urging said disks relatively apart axially and into yielding contact with said spiders, means operable consequent upon the relative rotation of said disks and spiders to wedge said disks relatively apart when the openings therein are offset from the openings in said spiders.

4. A stop valve comprising a body having an axial and a radial bore, spiders in said axial bore having aligned closed areas, disks within said bore intermediate said spiders having openings and closed areas selectively alignable with the open and closed areas of said spiders consequent upon rotation of said disks, resilient means intermediate said disks urging said disks relatively apart axially, cam means moving said disks relatively apart consequent upon rotation of said disks when the openings therein are offset from the openings in said spiders, a tension rod secured to both of said spiders and co-axial with and rotatably and slidably supporting said disks, whereby relative separation of the spiders is prevented.

5. A valve comprising a body having an axial bore therethrough partially closed at longitudinally separated points, closure plugs within said bore intermediate said points of closure said plugs having openings and closed areas complementary to the open and closed areas of said bore, means to change the position of said plugs relative to the closed areas of said passage, whereby the openings of said plugs may be aligned with and offset from the closed areas of said passage selectively, a tie rod engaging said separated closed areas of the passage to reinforce the same against axial separation.

6. A stop valve comprising a body having an axial bore and separated spiders in said bore having open and closed areas, rotatable disks intermediate said spiders having open and closed areas adapted to be aligned with the open and closed areas of the spiders selectively for opening and closing the valve, cam means on said disks adapted to move the disks relatively apart and into stressed engagement with said spiders when the closed areas on the disks are aligned with openings on the spider, a tie rod coaxial with said disks and spiders and engaging said spiders for reinforcing said spiders against axial separation when the disks are forced thereagainst, means associated with the pin for changing the tension thereof, whereby said spiders may be adjusted to withstand predetermined axial pressures.

7. A stop valve comprising a body having a bore and spiders in said bore having aligned open and closed areas, rotatable disks within said bore intermediate the spiders having open and closed areas adapted to be aligned with the open and closed areas of the spiders, cam means operable upon consequent rotation of said disks to stress the disks into engagement with said spiders in predetermined positions, cooperating telescopic sleeves, one on each of said disks and coaxial therewith, a coil spring within said sleeves for urging said disks relatively apart and into yieldable engagement with said spiders.

8. A stop valve comprising a body having an axial bore and coaxial plates within said bore in spaced relation to each other, said plates having aligned open and closed areas, valve disks in said bore intermediate the plates and having open and closed areas adapted to be selectively aligned with the open and closed areas of the plates consequent upon rotation of the disks, diametrically opposite cam means on one of said disks and cooperating cam means on the other of said disks, said diametrically opposite cams of each of said disks being different distances from the center of the disk whereby said disks may be revolved through an angle greater than 270° and the cam means on one of said disks engaging only one of the cam means on the other disks and the other cam means of each disk relatively pass the non-cooperating cam means of the other for permitting the disks to be revolved through substantially a complete revolution.

In testimony whereof, I hereunto affix my signature.

MICHAEL SMOLENSKY.